(12) United States Patent  
Septimio

(10) Patent No.: US 9,381,930 B2
(45) Date of Patent: Jul. 5, 2016

(54) SLAB TRANSPORTATION CART

(71) Applicant: Augusto P. Septimio, Charlotte, NC (US)

(72) Inventor: Augusto P. Septimio, Charlotte, NC (US)

( * ) Notice: Subject to any disclaimer, the term of this patent is extended or adjusted under 35 U.S.C. 154(b) by 0 days.

(21) Appl. No.: 14/204,249

(22) Filed: Mar. 11, 2014

(65) Prior Publication Data

US 2015/0259003 A1    Sep. 17, 2015

(51) Int. Cl.
*B62B 3/02* (2006.01)
*B62B 3/04* (2006.01)
*B62B 3/10* (2006.01)
*B62B 3/06* (2006.01)

(52) U.S. Cl.
CPC ... *B62B 3/02* (2013.01); *B62B 3/04* (2013.01); *B62B 3/06* (2013.01); *B62B 3/108* (2013.01)

(58) Field of Classification Search
CPC . B62B 3/02; B62B 3/04; B62B 3/06–3/0606; B62B 3/108
See application file for complete search history.

(56) References Cited

U.S. PATENT DOCUMENTS

| | | | |
|---|---|---|---|
| 2,465,206 A | 4/1946 | Davis | |
| 2,815,132 A | 5/1956 | Stone | |
| 4,150,755 A | 4/1979 | Trott et al. | |
| 4,339,219 A * | 7/1982 | Lay | E04F 21/1822 254/4 C |
| 4,600,348 A * | 7/1986 | Pettit | 414/11 |
| 5,224,808 A | 7/1993 | Macris | |
| 5,460,469 A | 10/1995 | Young | |
| 5,700,123 A | 12/1997 | Rokosh et al. | |
| 5,984,605 A | 11/1999 | Young | |
| 6,010,299 A | 1/2000 | Jesswein | |
| 6,857,836 B2 * | 2/2005 | Keller | 414/11 |
| 7,527,274 B2 | 5/2009 | Strauss et al. | |
| 8,348,287 B1 * | 1/2013 | Smith | 280/79.7 |

* cited by examiner

*Primary Examiner* — Jeffrey J Restifo
*Assistant Examiner* — Erez Gurari
(74) *Attorney, Agent, or Firm* — Blake E. Vande Garde

(57) ABSTRACT

A slab cart comprising: a castor frame including: four castors rotatably mounted to an underside of the castor frame; a primary upright member emanating upward from each end of the castor frame; two or more secondary upright members emanating upward from each end of the castor frame; a pivoting member engaged to the primary upright member and the secondary upright members; a platform frame engaged to the pivoting member and the primary and secondary upright members wherein the platform frame may pivot from a substantially vertical orientation to a substantially horizontal orientation; a support member secured to the platform frame which is used to aid in the retention of slabs; and a lift mechanism operationally associated with the castor frame, the upright members and the platform frame wherein the lift mechanism may raise or lower the platform frame relative to the castor frame.

14 Claims, 10 Drawing Sheets

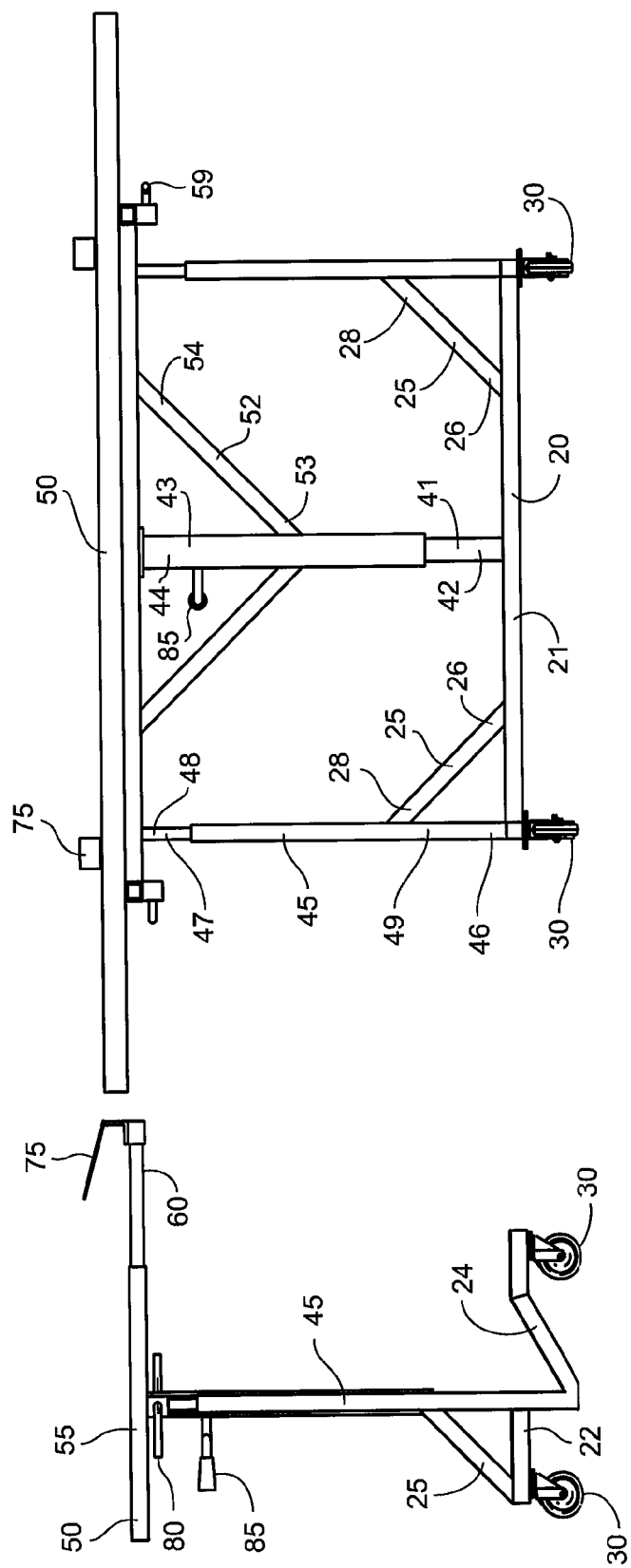

SLAB TRANSPORTATION CART

FIELD OF THE INVENTION

The present invention relates to a device used as a aid in the transportation of slab materials including stone.

BACKGROUND OF THE INVENTION

There are numerous materials which are commonly used as countertop materials in kitchens around the world. These materials include laminate, wood, sheet metal, tile, and stone. Looking back to at least the 1940's, the popularity of laminate for countertops can hardly be disputed. The popularity of laminate as a countertop material remained strong at least through the 1990's. However laminate has its drawbacks inv that it is susceptible to chipping, scratching, melting and de-laminating. In the 1960's, Corian® was developed and introduced to consumers. Corian® is a solid surface material similar to stone, however it is still susceptible to scratches and discoloration.

Beginning in the late 1990's, the availability of less expensive computer numerically controlled (CNC) saws allowed granite to become much more affordable for middle-class households. After measurements are taken regarding the dimensions of a desired countertop, those measurements are exported into a computer which cuts the slab to exacting specifications including cut-outs for sinks, faucets and fixtures. After the slab is polished, it is then ready to be installed by a skilled installer.

One drawback of stone countertops is their weight. A large stone slab intended for a cabinet or island in a homeowner's kitchen may weigh several hundred pounds. Most facilities where stone countertops are produced have one or more the crane lifts to aid in moving the slab from place to another. These lifts are used to load the slab on to or within a truck to deliver to a customer. However, once on site, the lifts are no longer available and the slabs must be transported within a building or dwelling by hand. Over the years numerous styles of carts have been used to move stone slabs from a vehicle to the inside of a building. One major drawback of these carts is that they are unstable and they require two or more people to operate and move the slab. Examples of these devices include:

U.S. Pat. No. 8,348,287 discloses a slab cart for sheet material which includes a dolly component; shelf component; and a mechanism for coupling the shelf component to the dolly component in a pivotable manner, so that the shelf component will go from a horizontal position to a vertical position. When shelf component is in the horizontal position, the sheet material may be slid off of the shelf component onto a support table or be manually slid from the support table onto the shelf component by a person using the slab cart. When the shelf component with the sheet material is in the vertical position, the sheet material will be held on edge to the shelf component and be transported by dolly component through the confines of narrow places. However, '287 does not disclose the inclusion of a lift mechanism operationally associated with the castor frame, the upright members and the platform frame wherein the lift mechanism may raise or lower said platform frame relative to the castor frame.

U.S. Pat. No. 5,460,469 discloses a panel loading and handling apparatus having a U shaped, horizontal frame with rollers mounted along the bottom. A pair of rods with hooks at their bottoms are mounted on rollers in the channels to roll up and down the channels. A cable winding apparatus is provided on one of the channels for winding a cable attached to the rods to raise the rods with the hooks at their bottom upward, simultaneously, along the channels to raise a drywall panel mounted thereon. The Support frame is adapted to be mounted on the rollers high enough off the ground to enable the base legs of a drywall panel lifter to roll underneath the frame to close proximity to the apparatus, and the hooks are adapted to be raised high enough in relation to lifting means on the lifter, so that the panel can be lifted by the hooks and, by the apparatus being in close proximity to the lifter having extended height lifting capability, can be transferred onto the lifting means of the lifter and lifted by the lifting means to an extended height. However, '469 is designed for use in drywall installation which is much lighter than stone slabs and lacks the ability to be used by a single person to install heavy countertops.

In light of all of the inadequacies with existing slab carts above, it is clear that a need exists to provide a device which aids an installer with the transportation and installation of countertops.

SUMMARY OF THE INVENTION

A slab cart comprising: a castor frame including: four castors rotatably mounted to an underside of the castor frame; a primary upright member emanating upward from a topside of the castor frame; two or more secondary upright members emanating upward from a topside of the castor frame; a pivoting member engaged to the primary upright member and the secondary upright members; a platform frame engaged to the pivoting member and the primary and secondary upright members wherein the platform frame may pivot from a substantially vertical orientation to a substantially horizontal orientation; a support member secured to the platform frame which is used to aid in the retention of slabs; and a lift mechanism operationally associated with the castor frame, the upright members and the platform frame wherein the lift mechanism may raise or lower the platform frame relative to the castor frame.

BRIEF DESCRIPTION OF THE DRAWINGS

FIG. 2 is a side view of a slab cart.
FIG. 3 is a front view of a slab cart.

DETAILED DESCRIPTION

Figure 1:
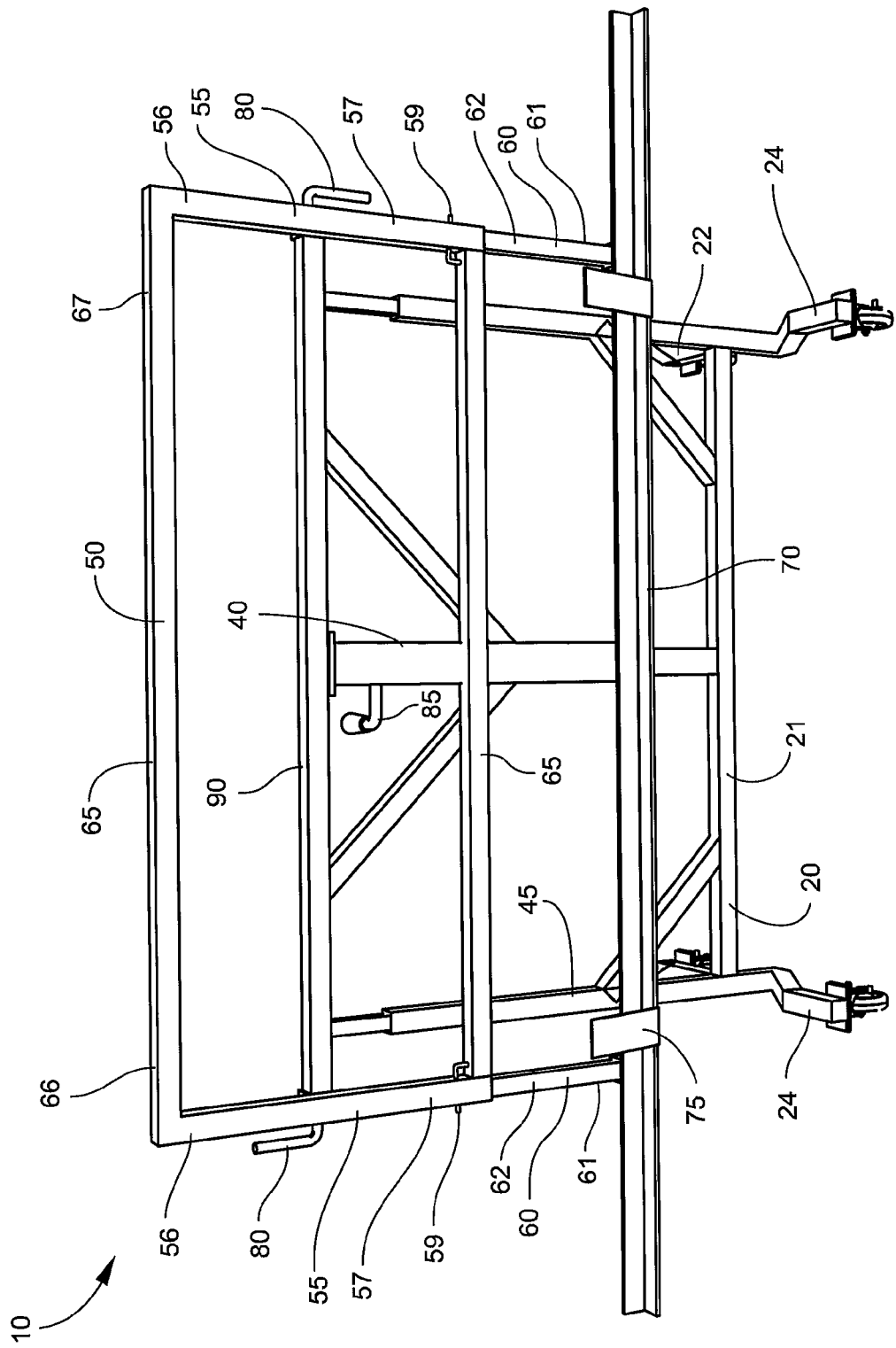
FIG. 1 is a proximal front view of a slab cart.
Figure 4:
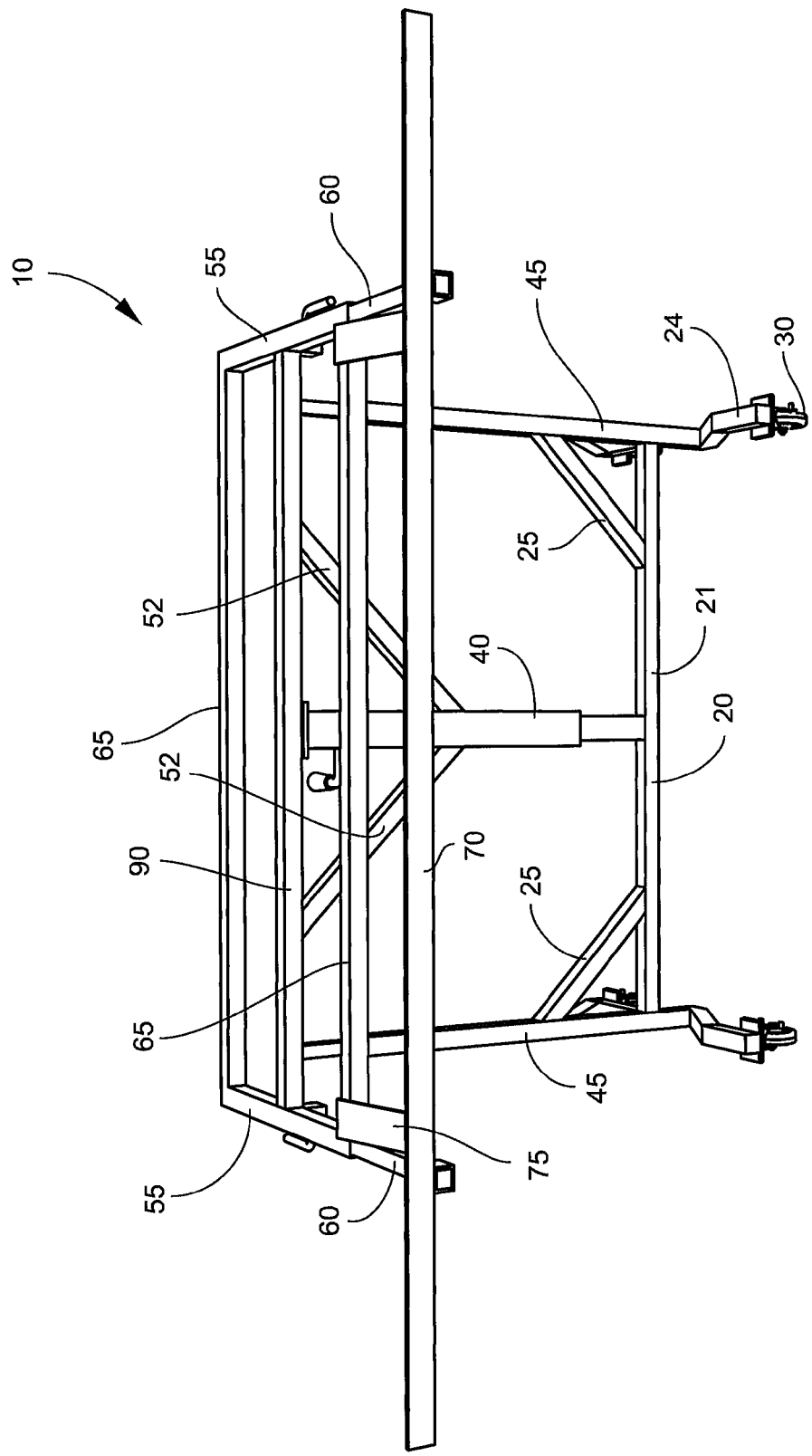
FIG. 4 is a proximal front view of a slab cart.

The instant invention describes a method for installing a countertop 5 which includes the steps of: loading a countertop 5 onto a slab cart 10, the slab cart 10 comprising a castor frame 20 including four castors 30 rotatably mounted to an underside of the castor frame 20. The slab cart 10 includes a primary upright member 40 emanating upward from a topside of the castor frame 20 and two or more secondary upright members 45 emanating upward from a topside or the ends of the castor frame 20. The primary upright member 40 and the secondary upright members 45 each are engaged to the castor frame 20 at their proximal ends. A pivoting member 90 is engaged to the primary upright member 40 and the secondary upright members 45 with the pivoting member to 90 being engaged to the distal ends of the primary upright member 40 and the secondary upright members 45. A platform frame 50 is engaged to the pivoting member 90 and the primary 40 and secondary upright members 45 wherein the platform frame 50 may pivot from a substantially vertical orientation to a substantially horizontal orientation. A support member 70 is secured to the platform frame 50 which is used to aid in the retention of slabs and or countertops 5. The slab cart 10 also includes a lift mechanism operationally associated with the castor frame 20, the primary 40 and secondary upright members 45 and the platform frame 50, wherein the lift mechanism may raise or lower the platform frame 50 relative to the castor frame 20. An operator will then position the countertop 5 in a desired installation location using the slab cart 10 using only a single person. The operator will then unload the countertop 5 from the slab cart 10 to the desired installation location.

Countertop 5, as used herein, refers to a horizontal surface in kitchens, bathrooms, lavatories, offices, workshops and workrooms which is generally installed upon a cabinet. Countertops 5 may be made from any material known in the art. In one embodiment of the present invention, a countertop 5 may be selected from the group including, natural stone (i.e., granite, marble), cultured stone, concrete, wood, composite material (i.e. Corian®, quartz), metal, tile, or a combination thereof.

Slab cart 10, as used herein, is a cart which is used to transport and position slabs of countertop material from one place to another. A slab cart 10 includes a castor frame 20 and a plurality of castors 30. The slab cart 10 also includes a primary upright member 40 and two or more secondary upright members 45 which are engaged to and emanate up from the castor frame 20. A pivoting member 90 is pivotally engaged to the primary upright member 40 and secondary upright members 45 at the end opposite to that which is engaged to the castor frame 20. A platform frame 50 is engaged to the primary upright member 40 and secondary upright members 45 and the pivoting member 90.

Figure 5:
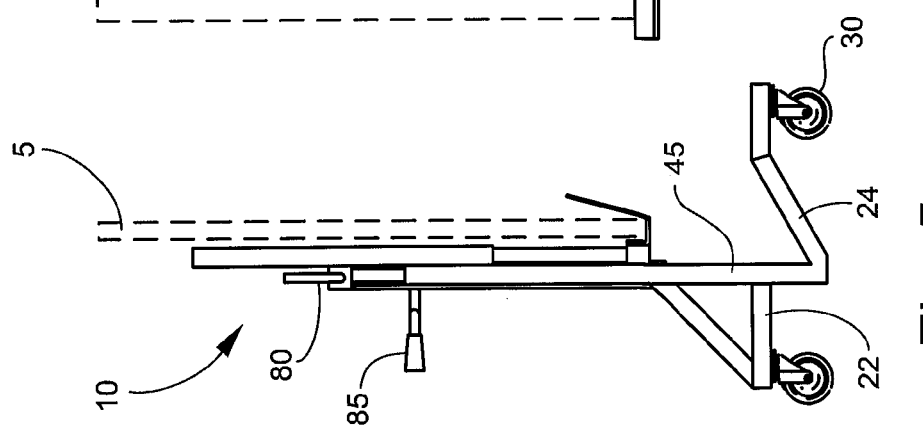
FIG. 5 is a side view of a slab cart.
Figure 7:
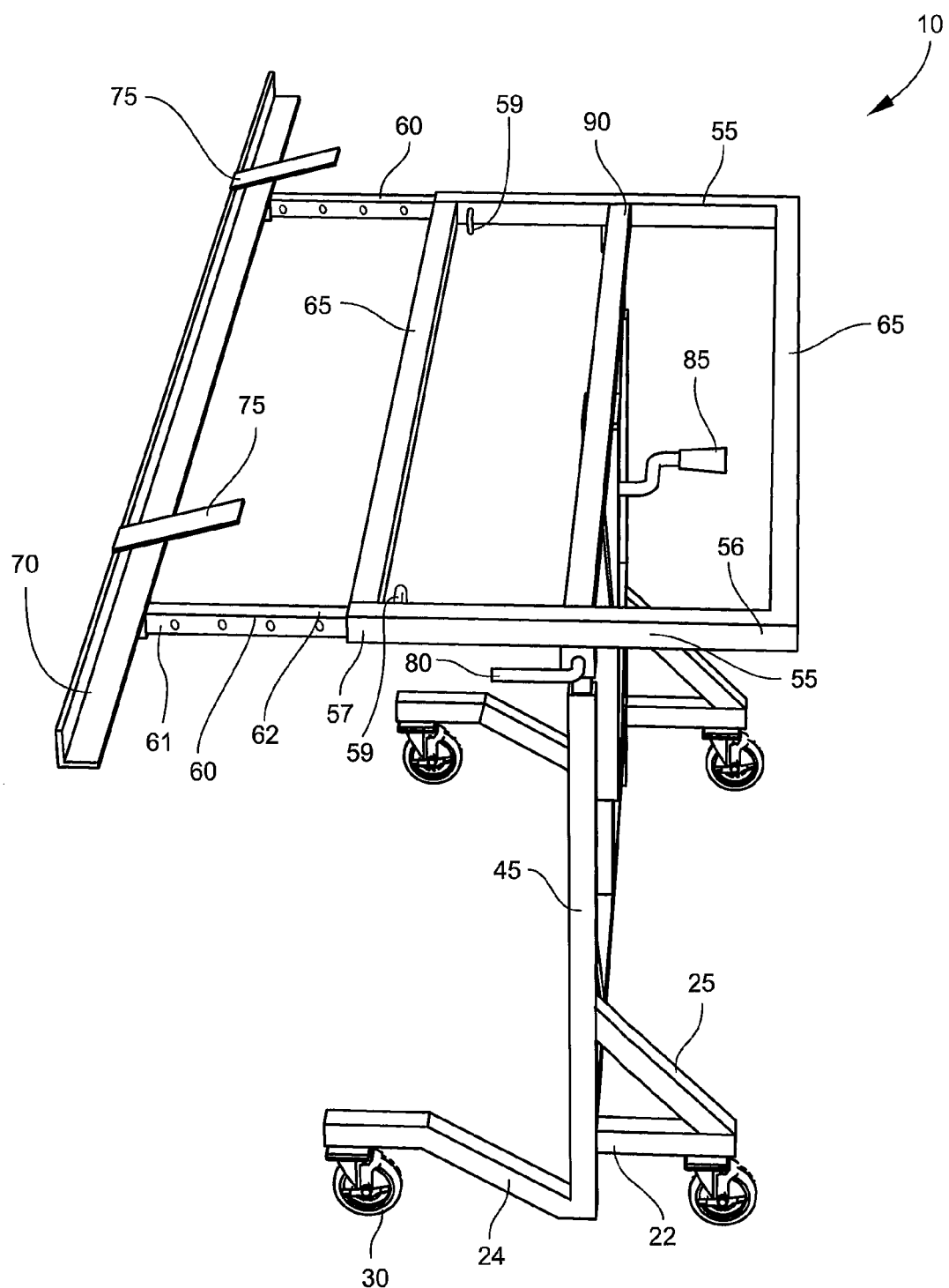
FIG. 7 is a proximal side view of a slab cart.
Figure 8:
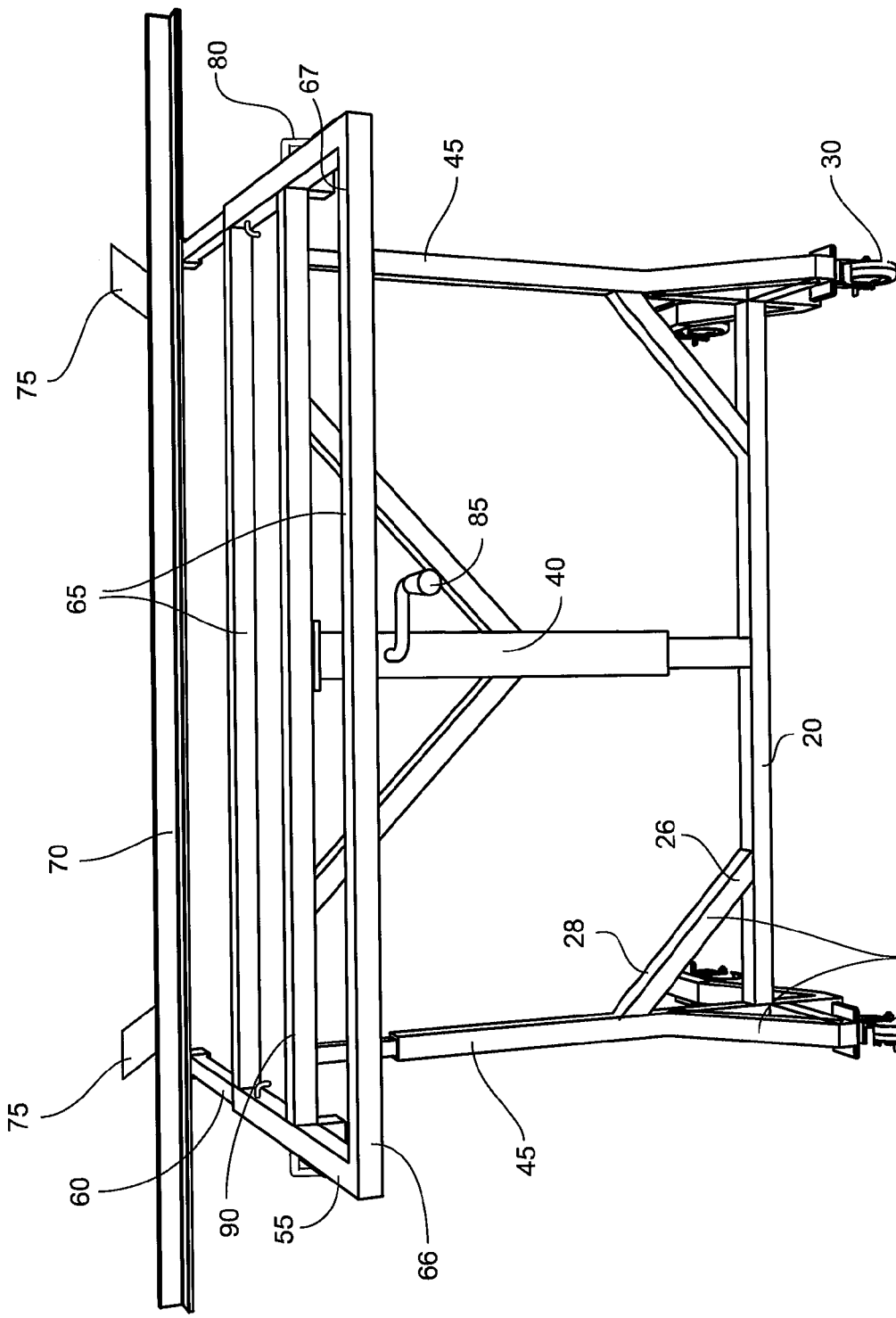
FIG. 8 is a proximal front view of a slab cart.
Figure 9:
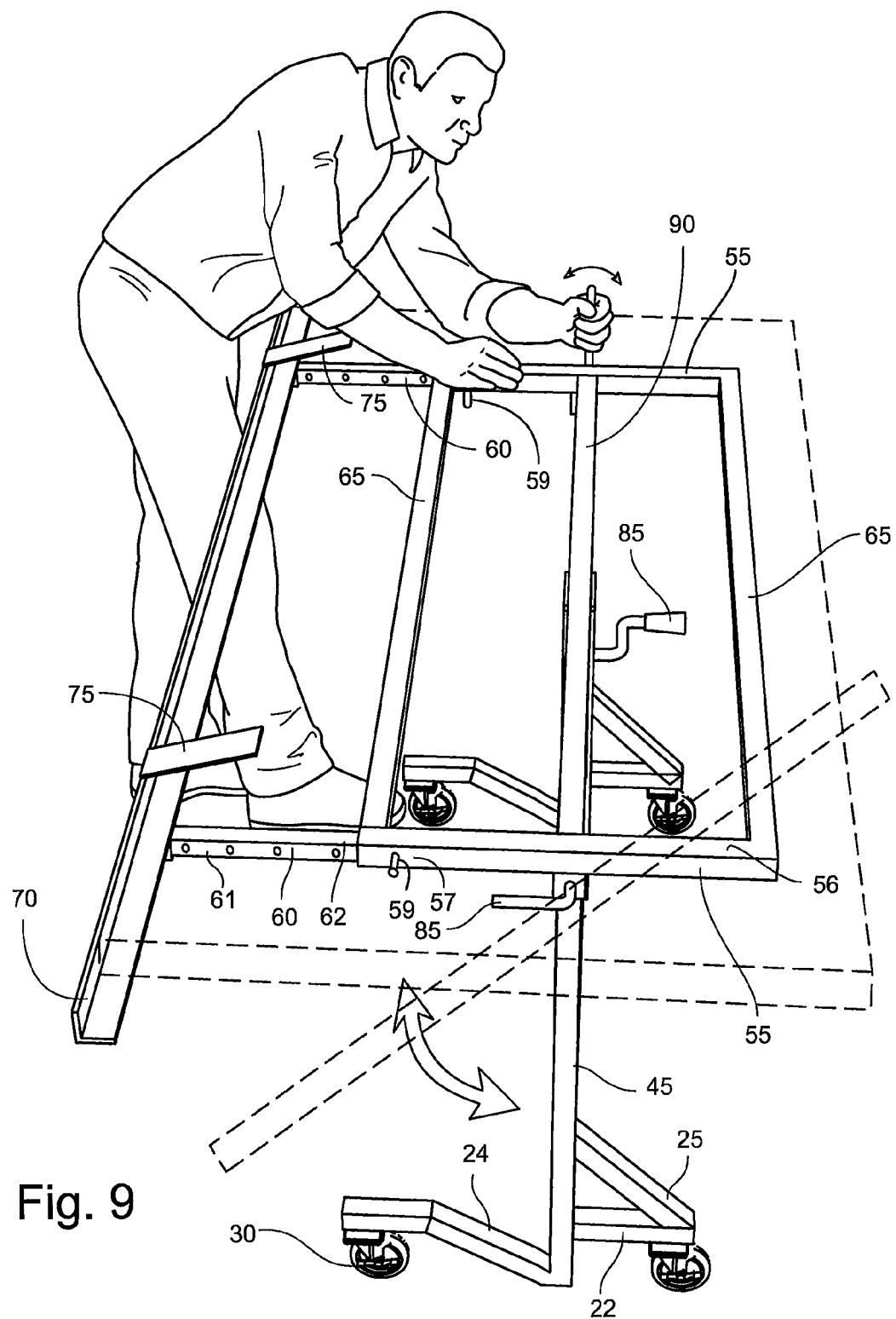
FIG. 9 is a proximal side view of the slab cart.
Figure 10:
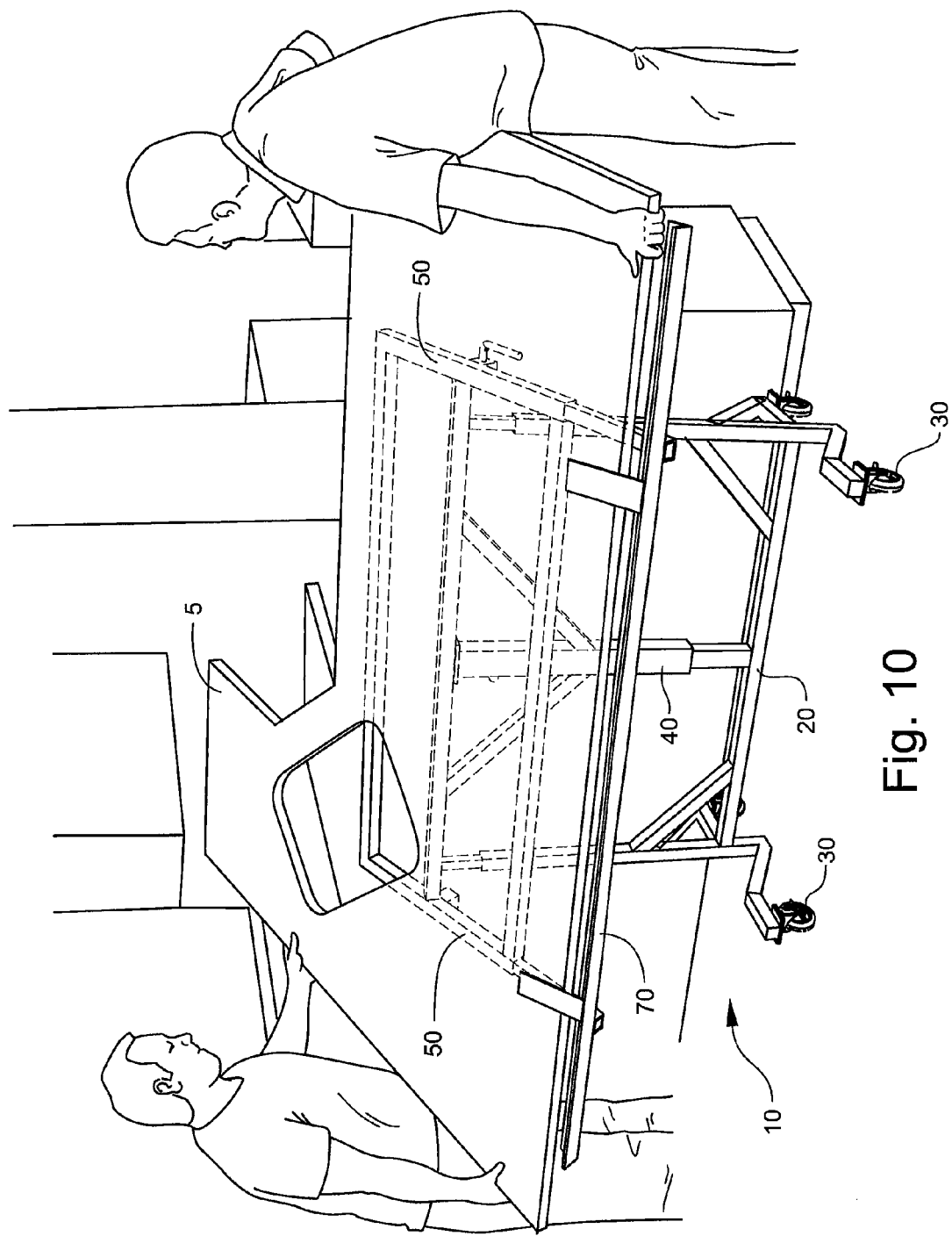
FIG. 10 is a front view of the slab cart in use.
Figure 11:
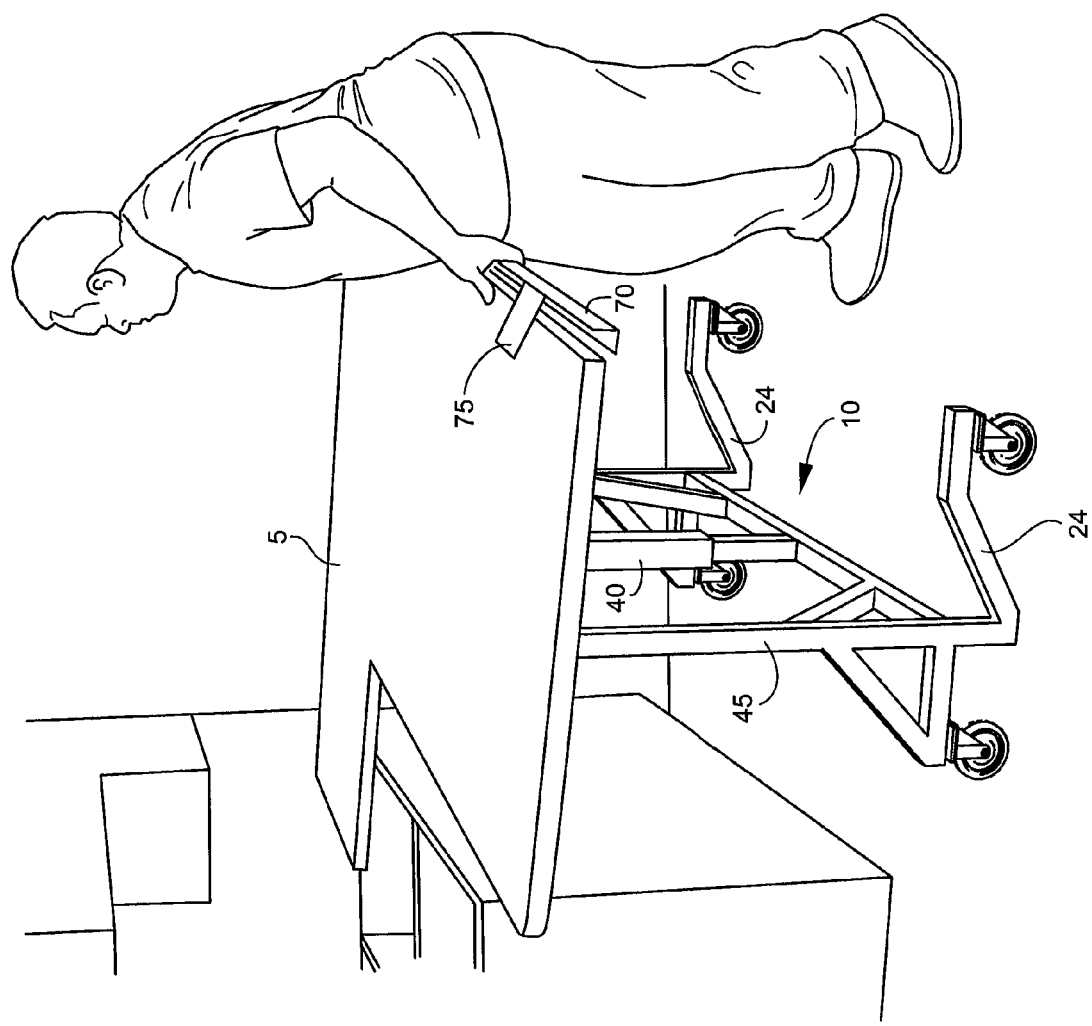
FIG. 11 is a side view of the slab cart in use.
Figure 12:
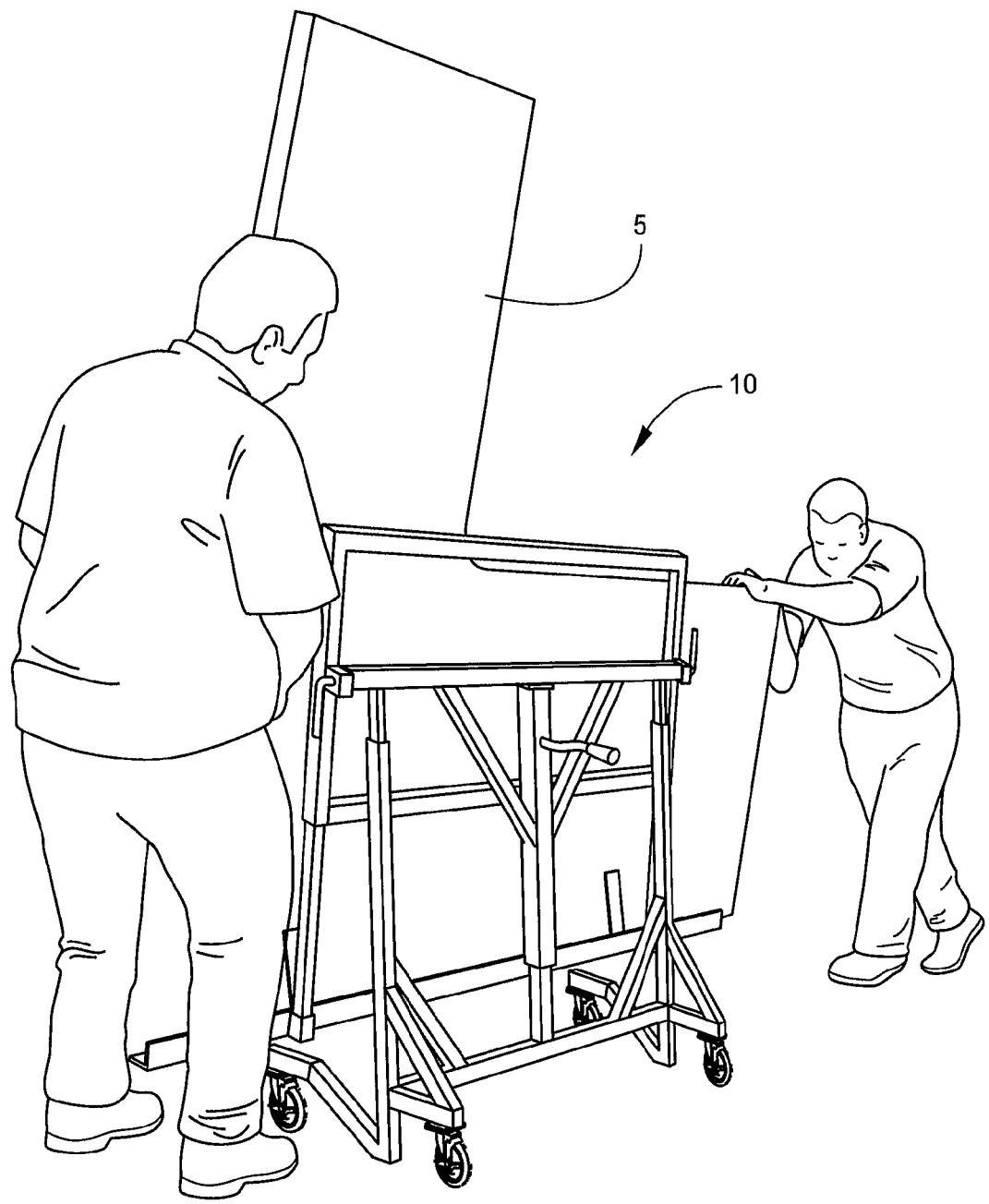
FIG. 12 is a proximal view of the slab cart in use.

Looking to the figures, the castor frame 20 is the base of the slab cart 10. The castor frame 20 includes a cross bar 21 which is engaged to the castor legs at either of its ends. (See FIGS. 3, 4, 8 and 12). A castor 30 is secured to the end of each castor leg. A castor 30, as used herein, is to be understood as it is known in the art. In one embodiment, a castor is a, single, double, or compound wheel that is designed to be mounted to the bottom of a larger object (i.e. a castor frame 20) so as to enable that object to be easily moved. Castors 30 are available in various sizes, and are commonly made of rubber, plastic, nylon, aluminum, or stainless steel. In one embodiment of the instant invention a castor frame 20 includes a pair of straight castor legs emanating out laterally from each end of a cross bar 21 (FIG. 7) and a pair of angled castor legs 24 which emanate out laterally from each end of the cross bar 21, but on the opposite side as the straight castor legs. The angled castor legs 24 allow a support member 70 and the platform frame 50 to pivot two a vertical or near vertical position as can be seen in FIGS. 5, 7 and 9. The castor legs 22, 24 may be reinforced with castor frame supports 25 as shown in FIGS. 4, 7 and 8-12. The castor frame supports 25 are generally secured to either a crossbar 21 or a castor leg 22, 24 at its proximal end 26 and secured to a secondary upright member 45 at its distal end 28. The castor frame supports 25 reinforce the stability of the crossbar 21, the castor legs 22, 24 and the secondary upright members 45.

Primary upright number 40, as shown in the figures, emanates upward from a topside of the cross bar 21 of the castor frame 20. The primary upright member 40 is located approximately in the center of the horizontal cross bar 21 and emanates vertically upward. The primary upright member 40 is secured at its proximal end 42 to the upper surface of a crossbar 21 and it is secured at its distal end 44 to the surface of a pivoting member 90. In one embodiment of the instant invention, a lift mechanism 84 is housed within a primary upright member 40. The primary upright member 40 may be stabilized and reinforced by one or more platform frame supports 52. The proximal end 53 of each platform frame support 52 is engaged and secured to the side of the primary upright member 40 and the distal end 54 of each platform frame support 52 is engaged and secured to the pivoting member 90.

In one embodiment of the present invention, the primary upright member 40 includes an inner member 41 which is telescopically engaged to an outer member 43. The inner member 41 (the proximal end 42 of the primary upright member 40) is secured to the cross bar 21 of the castor frame 20 and the outer member 43 (the distal end 44 of the primary upright member 40) is secured to the surface of the pivoting member 90. A lift mechanism is housed within the primary upright member 40 and functions to raise and lower a platform frame 50, which is engaged to the pivoting member 90, while the inner member 41 and outer member 43 remain telescopically engaged to one another.

Secondary upright member 45, as used herein, refers to a pair of upright members which are engaged to each end of the cross bar 21 of the castor frame 20. The proximal end 46 of the secondary upright member 45 engages the cross bar. A pair of castor legs 22, 24 engage the proximal end 46 of each secondary upright member 45. The distal end 48 of the secondary upright member 45 engages the pivoting member 90. In one embodiment of the present invention, each secondary upright member 45 is positioned an equal distance away from the primary upright member 40. Each secondary upright member 45 may be stabilized and reinforced by one or more castor frame supports 25. The proximal end 26 of each castor frame support 25 is engaged and secured to the side of a secondary upright member 45 and the distal end 28 of each castor frame support 25 is engaged and secured to the crossbar 21.

In one embodiment of the present invention, the secondary upright member 45 includes an inner member 47 which is telescopically engaged to an outer member 49. The outer member 49 (the distal end 46 of the secondary upright member 45) is secured to the cross bar 21 of the castor frame 20 and the inner member 47 (the proximal end 46 of the secondary upright member 45) is secured to the surface of the pivoting member 90. A lift mechanism is housed within the primary upright member 40 and functions to raise and lower a platform frame 50, which is engaged to the pivoting member 90, while the inner member 47 and outer member 49 remain telescopically engaged to one another. The lift mechanism 84 may be operated by any means known in the art. In one embodiment of the present invention the lift mechanism 84 may be operated with the crank handle 85. In another embodiment of the present invention, the lift mechanism may be selected from the group including, but not limited to, pneumatic, mechanical, electronic, a chain mechanism, or a combination thereof.

Platform frame 50, as used herein, refers to the primary device which supports and manipulates a countertop. The platform frame 50 includes a pair of outer rails 55 which are telescopically engaged to a pair of inner rails 60. The distal end 57 of the outer rail 55 is telescopically engaged to the proximal end 61 of the inner rail 60. One or more platform frame stiles 65 is engaged to each outer rail 55 and a pivoting member 90 is engaged to each of the outer rails 55 some distance from the platform frame stiles 65. A support member 70 is engaged to the distal ends 62 of the inner rail 60. One or more rail locking pins 59 may be disengaged to allow the telescopic adjustment and movement of the inner rails 60 relative to the outer rails 55 and re-engaged to lock the position of the inner rails 60 relative to the outer rails 55. The telescopic adjustment and movement of the inner rails 60 within the outer rails 55 allows for the adjustment of the width of the platform frame 50 which allows for the balanced support and transportation of varying sizes, shapes and weights of countertops and countertop materials.

Figure 6:
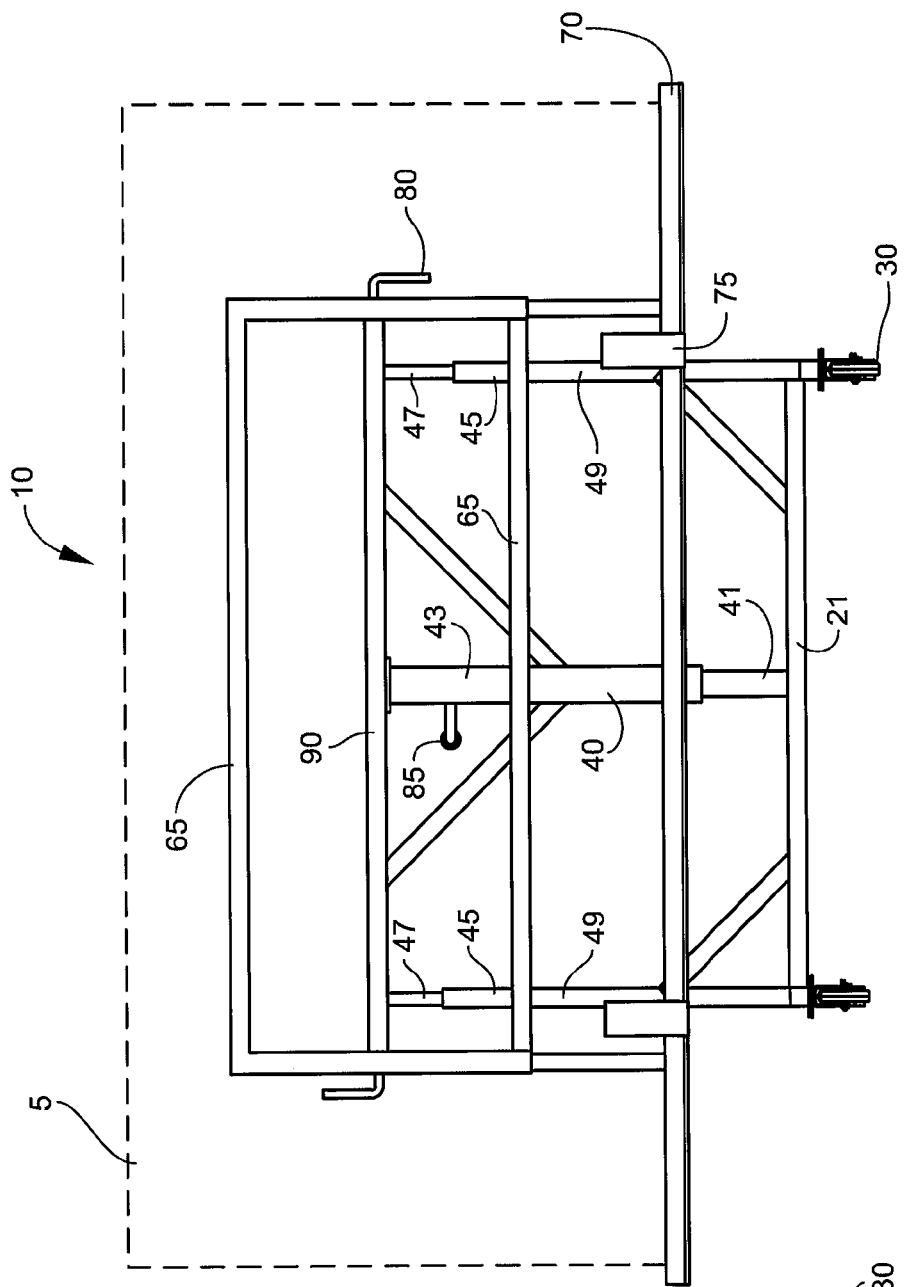
FIG. 6 is a front view of a slab cart.

The platform frame 50 may pivot from a substantially vertical orientation (FIG. 2) to a substantially horizontal orientation (FIG. 1) and back again. The support member 70 is designed to support and maintain the position of the countertop material when the countertop is not in a horizontal position. The support member 70 may be L-shaped, or U-shaped. In one embodiment of the present invention, a support member 70 may be an L-shaped member which further includes one or more U-shaped members 75 secured along the length of the support member 70 (See Figs.). The platform frame 50 may also include one or more primary locking pins 80 which may be engaged to prevent the platform frame 50 from pivoting and disengaged to allow the platform frame 50 to remain stationary. The platform frame 50 may remain stationary in a substantially horizontal position (FIGS. 2, 3, 4 & 7) or a substantially vertical position (FIGS. 1, 5 & 6). The platform frame 50, and more particularly the pivoting member 90, may be stabilized and reinforced by one or more platform frame supports 52. The proximal end 53 of each platform frame support 52 is engaged and secured to the side of the primary upright member 40 and the distal end 54 of each platform frame support 52 is engaged and secured to the pivoting member 90.

In one embodiment of the present invention, one platform frame stile 65 is engaged to the proximal end 56 of each outer rail 55, another platform frame stile 65 is engaged to the distal end 57 of each outer rail 55, and a pivoting member 90 is engaged to each of the outer rails 55 at a location which is approximately equidistant between each platform frame stile 65.

Pivoting member 90, as used herein, refers to a part of the platform frame 50 which allows the platform frame to pivot from a substantially horizontal position to a substantially vertical position as illustrated in the figures.

The slab cart 10, as described herein, may be comprised of metal, plastic, composite material, or any material having suitable strength to sustain the weight of a slab of material suitable for use as a countertop. In one embodiment of the present invention, the slab cart is comprised of tubular metal (round, square, etc.) of varying lengths, gauges and thicknesses. In another embodiment of the present invention, the slab cart is comprised of square tube metal members which are welded to one another. In yet another embodiment, the slab cart is comprised of I-beams, tubular members, solid members, or a combination thereof. In any of the above embodiments, the metal used may be selected from the group including, but not limited to, iron, steel, aluminum, magnesium, titanium, or any combination (i.e. alloy) thereof.

In one embodiment of the present invention, the materials used to construct the slab cart 10 must enable the cart 10 to be strong enough to support and transport the weight of any size countertop made of metal, stone, wood, tile, composite material, or any other material known in the art to be used for a countertop. In another embodiment, the materials used to construct the slab cart 10 must enable the cart 10 to be strong enough to support and transport a countertop weighing between 10 and 1500 pounds. In still another embodiment, the materials used to construct the slab cart 10 must enable the cart 10 to be strong enough to support and transport a countertop weighing between 10 and 1200 pounds. In yet another embodiment, the materials used to construct the slab cart 10 must enable the cart 10 to be strong enough to support and transport a countertop weighing between 10 and 1000 pounds. In still another embodiment, the materials used to construct the slab cart 10 must enable the cart 10 to be strong enough to support and transport a countertop weighing between 10 and 800 pounds. In yet another embodiment, the materials used to construct the slab cart 10 must enable the cart 10 to be strong enough to support and transport a countertop weighing between 10 and 600 pounds. In another embodiment, the materials used to construct the slab cart 10 must enable the cart 10 to be strong enough to support and transport a countertop weighing between 10 and 400 pounds.

In one embodiment of the above method, the slab cart 10 further includes one or more primary locking pins 80 engaged to the platform frame 50 and operationally engaged to the secondary upright members 45 wherein the platform frame 50 may be locked into a desired orientation (i.e. substantially horizontal, substantially vertical, or any point in between).

The instant invention further describes a method for installing a countertop 5 which including the steps of: providing a slab cart 10 which includes a castor frame 20 with four castors 30 rotatably mounted to an underside of the castor frame 20, a primary upright member 40 emanating upward from the topside of the castor frame 20, two or more secondary upright members 45 emanating upward or secured to each end of the castor frame 20, and a pivoting member 90 engaged to the primary upright member 40 and the secondary upright members 45. A platform frame 50 is engaged to the pivoting member 90 and the primary 40 and secondary upright members 45 where the platform frame 50 may pivot from a substantially vertical orientation to a substantially horizontal orientation. A support member 70 is secured to the platform frame 50 which is used to aid in the retention of countertops 5 and a lift mechanism operationally associated with the castor frame 20, the upright members 40, 45 and the platform frame 50 wherein the lift mechanism may raise or lower the platform frame 50 relative to the castor frame 20. A countertop 5 is loaded onto the cart 10, the countertop 5 is transported using the cart 10 to a desired installation location where the countertop 5 is unloaded from the cart 10 to the desired installation location.

In one embodiment of the above method, the slab cart 10 further includes one or more primary locking pins 80 engaged to the platform frame 50 and operationally engaged to the secondary upright members 45 wherein the platform frame 50 may be locked into a desired orientation (i.e. substantially horizontal, substantially vertical, or any point in between). In another embodiment of the above method, the lift mechanism may be pneumatic, mechanical, electronic, a chain mechanism, or a combination thereof. In another embodiment of the above method, the primary 40 and secondary 45 upright members are comprised of two or more sections which are telescopically engaged to one another in order to extend or retract as the lift mechanism raises or lowers the platform frame 50 relative to the castor frame 20 allowing the platform frame to be raised or lowered to the same or substantially the same height as the installation height of the countertop.

In another embodiment of the above method, the a platform frame 50 includes a pair of outer rails 55 secured to each end of the pivoting member 90, each outer rail 55 having a stile 65 secured to each end forming a rectangular platform frame, and a pair of inner rails 60, each telescopically engaged to the pair of outer rails 55 at one end and having a support member 70 engaged to the opposite end. In still another embodiment of the above method, the support member 70 further comprises one or more u-shaped members 75 secured to the support member to aid in the support and retention of countertops during their transport and manipulation. In yet another embodiment of the above method, which further comprises a pair of locking pins 59 secured to the outer rails 55 and inner rails 60, wherein the locking pins 59 may be engaged to secure the location of the inner rail 60 relative to the outer rail 55 or disengaged to allow the telescopic movement of the inner rail 60 relative to the outer rail 55.

One embodiment of any of the above methods includes the loading, positioning and unloading of a countertop using any of the above carts 10 being carried out by a single person.

The instant invention also includes a slab cart 10 comprising a castor frame 20 which includes four castors 30 rotatably mounted to an underside of the castor frame 20, a primary upright member 40 emanating upward from a topside of the castor frame, 20, two or more secondary upright members 45 emanating upward from the ends of the castor frame 20, a pivoting member 90 engaged to the primary upright member 40 and the secondary upright members 45 and a platform frame 50 engaged to the pivoting member 90 and the primary 40 and secondary 45 upright members where the platform frame 50 may pivot from a substantially vertical orientation to a substantially horizontal orientation. The slab cart 10 also includes a support member 70 secured to the platform frame 50 which is used to aid in the retention of countertops and a lift mechanism operationally associated with the castor frame 20, the upright members 40, 45 and the platform frame 50 where the lift mechanism may raise or lower the platform frame 50 relative to the castor frame 40.

In one embodiment of the instant invention, the slab cart 10 further comprises one or more locking pins 80 which are engaged to the platform frame 50 and operationally engaged to the secondary upright members 45 wherein the platform frame 50 may be locked into a desired orientation (i.e. substantially horizontal, substantially vertical, or any point in between). In another embodiment, the primary 40 and secondary 45 upright members are comprised of two or more sections which are telescopically engaged to one another in order to extend or retract as the lift mechanism raises or lowers the platform frame 50 relative to the castor frame 20. In still another embodiment, the a platform frame 50 includes a pair of outer rails 55 secured to each end of the pivoting member 90, each the outer rail 55 having a stile secured to each end forming a rectangular platform frame and a pair of inner rails 60, each telescopically engaged to the pair of outer rails 55 at one end and having a support member 70 engaged to the opposite end. In yet another embodiment, the support member 70 further comprises one or more u-shaped members 75 secured to the support member 70 to aid in the support and retention of slabs during their transport and manipulation. In still another embodiment, the cart 10 further comprises a pair of locking pins 59 secured to the outer rails 55 and inner rails 60, wherein the locking pins 59 may be engaged to secure the location of the inner rail 60 relative to the outer rail 55 or disengaged to allow the telescopic movement of the inner rail 60 relative to the outer rail 55.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

What is claimed is:

1. A method for installing a countertop which includes the steps of: loading a countertop onto a slab cart, said slab cart comprising
    a castor frame including:
        four castors rotatably mounted to an underside of said castor frame;
        a primary upright member emanating upward from a topside of a cross bar of said castor frame;
        two or more secondary upright members emanating upward from a topside of the crossbar of said castor frame wherein said primary upright member and said secondary upright members being substantially linear to one another;
        a pivoting member engaged to said primary upright member and said secondary upright members;
        a platform frame engaged to said pivoting member and said primary and secondary upright members wherein said platform frame may pivot from a substantially vertical orientation to a substantially horizontal orientation;
            a support member secured to said platform frame which is used to aid in the retention of slabs; and
        a lift mechanism operationally associated said castor frame, said primary upright member, said secondary upright members and said platform frame wherein said lift mechanism may raise or lower said platform frame relative to said castor frame and said secondary upright members provide stability of said slab as it is raised or lowered;
    positioning the countertop in a desired installation location using said slab cart using only a single person;
    unloading said countertop from said cart to said desired installation location.

2. The method of claim 1 wherein said countertop slab cart further comprising one or more locking pins engaged to said platform frame and operationally engaged to said secondary upright members wherein said platform frame may be locked into a desired orientation.

3. The method of claim 1 wherein said lift mechanism being pneumatic, mechanical, electronic, a chain mechanism, or a combination thereof.

4. The method of claim 1 wherein said primary and secondary upright members being comprised of two or more sections which are telescopically engaged to one another in order to extend or retract as the lift mechanism raises or lowers the platform frame relative to the castor frame.

5. The method of claim 1 wherein said a platform frame includes a pair of outer rails 55 secured to each end of said pivoting member, each said outer rail having a stile secured to each end forming a rectangular platform frame; and
    a pair of inner rails, each telescopically engaged to said pair of outer rails at one end and having a support member 70 engaged to the opposite end.

6. The method of claim 5 wherein said support member 70 further comprising one or more u-shaped members 75 secured to said support member to aid in the support and retention of slabs during their transport and manipulation.

7. The method of claim 5 further comprising a pair of locking pins secured to said outer rails 55 and inner rails 60, wherein said locking pins may be engaged to secure the location of the inner rail 55 relative to said outer rail 60 or disengaged to allow the telescopic movement of said inner rail 55 relative to said outer rail 60.

8. A method for installing a countertop which including the steps of:
providing a slab cart comprising:
a castor frame including:
four castors rotatably mounted to an underside of said castor frame;
a primary upright member emanating upward from a topside of a cross bar of said castor frame;
two or more secondary upright members emanating upward from a topside of the crossbar of said castor frame wherein said primary upright member and said secondary upright members being substantially linear to one another;
a pivoting member engaged to said primary upright member and said secondary upright members;
a platform frame engaged to said pivoting member and said primary and secondary upright members wherein said platform frame may pivot from a substantially vertical orientation to a substantially horizontal orientation;
a support member secured to said platform frame which is used to aid in the retention of countertops; and
a lift mechanism operationally associated said castor frame, said primary upright member, said secondary upright members and said platform frame wherein said lift mechanism may raise or lower said platform frame relative to said castor frame and said secondary upright members provide stability of said slab as it is raised or lowered;
loading a countertop onto said cart;
transporting said countertop using said cart to a desired installation location of said countertop;
unloading said countertop from said cart to said desired installation location.

9. The method of claim 8 wherein said countertop slab cart further comprising one or more locking pins engaged to said platform frame and operationally engaged to said secondary upright members wherein said platform frame may be locked into a desired orientation.

10. The method of claim 8 wherein said lift mechanism being pneumatic, mechanical, electronic, a chain mechanism, or a combination thereof.

11. The method of claim 8 wherein said primary and secondary upright members being comprised of two or more sections which are telescopically engaged to one another in order to extend or retract as the lift mechanism raises or lowers the platform frame relative to the castor frame.

12. The method of claim 8 wherein said a platform frame includes a pair of outer rails 55 secured to each end of said pivoting member, each said outer rail having a stile secured to each end forming a rectangular platform frame; and
a pair of inner rails, each telescopically engaged to said pair of outer rails at one end and having a support member 70 engaged to the opposite end.

13. The method of claim 12 wherein said support member 70 further comprising one or more u-shaped members 75 secured to said support member to aid in the support and retention of countertops during their transport and manipulation.

14. The method of claim 12 further comprising a pair of locking pins secured to said outer rails and inner rails, wherein said locking pins may be engaged to secure the location of the inner rail relative to said outer rail or disengaged to allow the telescopic movement of said inner rail relative to said outer rail.

* * * * *